(12) United States Patent
Baba et al.

(10) Patent No.: US 10,717,394 B2
(45) Date of Patent: Jul. 21, 2020

(54) SPEAKER MOUNTING STRUCTURE TO FRONT PILLAR IN VEHICLE AND METHOD OF MANUFACTURING VEHICLE

(71) Applicant: MAZDA MOTOR CORPORATION, Hiroshima (JP)

(72) Inventors: Yasunori Baba, Hiroshima (JP); Yuuhei Furuse, Aki-gun (JP); Minoru Nakamura, Higashihiroshima (JP); Masayuki Kage, Hiroshima (JP); Kouki Hirao, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/344,040

(22) PCT Filed: Oct. 5, 2017

(86) PCT No.: PCT/JP2017/036260
§ 371 (c)(1),
(2) Date: Apr. 23, 2019

(87) PCT Pub. No.: WO2018/083938
PCT Pub. Date: May 11, 2018

(65) Prior Publication Data
US 2019/0256010 A1    Aug. 22, 2019

(30) Foreign Application Priority Data

Nov. 1, 2016  (JP) .................................. 2016-214393

(51) Int. Cl.
*B60R 11/02* (2006.01)
*B60R 13/02* (2006.01)
(Continued)

(52) U.S. Cl.
CPC .......... *B60R 11/0217* (2013.01); *B60R 11/02* (2013.01); *B60R 13/02* (2013.01);
(Continued)

(58) Field of Classification Search
CPC ..... B60R 11/0217; B60R 11/02; B60R 13/02; B60R 13/025; B60R 2011/0022;
(Continued)

(56) References Cited

U.S. PATENT DOCUMENTS 4,876,723 A  10/1989 Fang
6,752,366 B2 *  6/2004 Chuang .................. H04R 1/025
                                                248/220.21
(Continued)

FOREIGN PATENT DOCUMENTS

CN     1044376 A    8/1990
CN     103568973 A  2/2014
(Continued)

OTHER PUBLICATIONS

The extended European search report issued by the European Patent Office dated Jun. 26, 2019, which corresponds to European Patent Application No. 17866765.5-1132 and is related to U.S. Appl. No. 16/344,040.

(Continued)

*Primary Examiner* — William A Jerez Lora
(74) *Attorney, Agent, or Firm* — Studebaker & Brackett PC

(57) ABSTRACT

A device is mounted on a vehicle body and housed in a space between a pillar inner and a pillar trim. A speaker is inserted into an opening portion opened in the pillar trim from an inside of a vehicle compartment and retained therein. A harness is connected to the speaker and disposed in the space. In a part of the speaker to be inserted into an inner side of the pillar trim, a protrusion portion is provided that (Continued)

protrudes radially outward. An insertion acceptance portion that is a gap for accepting insertion of the protrusion portion is provided in an opening edge portion facing the opening portion on an inner surface side of the pillar trim. The insertion acceptance portion has a width larger than a width of the protrusion portion.

14 Claims, 13 Drawing Sheets

(51) Int. Cl.
    *B62D 65/14*     (2006.01)
    *H04R 1/02*     (2006.01)
    *B60R 11/00*     (2006.01)

(52) U.S. Cl.
    CPC ............ *B60R 13/025* (2013.01); *B62D 65/14* (2013.01); *H04R 1/02* (2013.01); *B60R 2011/0022* (2013.01); *B60R 2011/0047* (2013.01); *H04R 2499/13* (2013.01)

(58) Field of Classification Search
    CPC ... B60R 2011/0047; B62D 65/14; H04R 1/02; H04R 2499/13
    USPC .......................................... 381/86, 302, 303
    See application file for complete search history.

(56) References Cited

U.S. PATENT DOCUMENTS

| | | |
|---|---|---|
| 2006/0145376 A1 | 7/2006 | Hager et al. |
| 2007/0013200 A1 | 1/2007 | Totani et al. |
| 2007/0121990 A1 | 5/2007 | Iwata |
| 2014/0028044 A1 | 1/2014 | Hamamoto et al. |
| 2016/0368430 A1* | 12/2016 | Orellana .................. H04R 5/02 |

FOREIGN PATENT DOCUMENTS

| | | | |
|---|---|---|---|
| CN | 205050549 U | 2/2016 | |
| CN | 205632316 U | 10/2016 | |
| DE | 102009021956 A1 | 11/2010 | |
| JP | SHO48-23397 Y2 | 7/1973 | |
| JP | H06227340 A | 8/1994 | |
| JP | H11091512 A | 4/1999 | |
| JP | 2002-190383 | * | 1/2001 |
| JP | 2001315665 A | 11/2001 | |
| JP | 2006041998 A | 2/2006 | |
| JP | 2006094254 A | 4/2006 | |
| JP | 2008110681 A | 5/2008 | |
| WO | 2004039636 A1 | 5/2004 | |
| WO | WO-2011022892 A1 * | 3/2011 | ......... B60R 11/0217 |

OTHER PUBLICATIONS

An Office Action mailed by the State Intellectual Property Office of the People's Republic of China dated Nov. 4, 2019, which corresponds to Chinese Patent Application No. 201780065988.1 and is related to U.S. Appl. No. 16/344,040; with English translation.

International Search Report issued in PCT/JP2017/036260; dated Dec. 26, 2017.

Communication pursuant to Article 94(3) EPC issued by the European Patent Office on Jan. 21, 2020 which corresponds to European Patent Application No. 17 866 765.5-1132 and is related to U.S. Appl. No. 16/344,040.

* cited by examiner

# SPEAKER MOUNTING STRUCTURE TO FRONT PILLAR IN VEHICLE AND METHOD OF MANUFACTURING VEHICLE

TECHNICAL FIELD

The present disclosure relates to a structure for mounting a speaker on a front pillar in a vehicle and a method of manufacturing a vehicle.

BACKGROUND ART

Even some of vehicles have mounted with tweeters for a high frequency sound range as audio speakers in addition to woofers for a low frequency sound range. Among possible positions for mounting tweeters are portions on both widthwise sides of an upper surface of a dashboard and a base portion of a front pillar. Of these portions, mounting a tweeter on a base portion of a front pillar is desirable in a case of a sound-quality-oriented tweeter (Patent Literature 1).

Various devices such as a defroster duct and a curtain air bag are housed within a pillar trim of a front pillar (Patent Literature 2 and 3).

CITATION LIST

Patent Literature

Patent Literature 1: Patent Literature 1: Japanese Unexamined Patent Publication No. 2006-94254
Patent Literature 2: Japanese Unexamined Patent Publication No. Hei 11-91512
Patent Literature 3: Japanese Unexamined Patent Publication No. Hei 06-227340

SUMMARY OF INVENTION

However, with a structure for mounting a speaker in a vehicle according to a conventional art, a tweeter harness may interfere with a defroster duct and other devices in a pillar trim of a front pillar. Specifically, in the conventional art, a tweeter with a harness connected thereto is attached to a pillar trim in advance, and the pillar trim is assembled into a vehicle body side. On this occasion, the defroster duct and other devices are mounted on the vehicle body side in advance.

Accordingly, with the conventional art, it is difficult for a worker associated with the assembly to visually check a positional relationship between the harness connected to the tweeter and the defroster duct or other devices when the pillar trim is assembled into the vehicle body side. In the conventional art, therefore, the tweeter harness may interfere with the defroster duct or other devices in the pillar trim of the front pillar.

An object of the present disclosure, which has been made in view of a solution of the above problem, is to provide a structure for mounting a speaker on a front pillar in a vehicle, the structure capable of suppressing interference of a harness connected to the speaker disposed at the front pillar with a device mounted on a vehicle body, and to provide a method of manufacturing a vehicle.

In a structure for mounting a speaker on a front pillar in a vehicle according to one aspect of the present disclosure, the front pillar has a pillar inner attached to a vehicle body, and a pillar trim attached to the pillar inner with a space defined between the pillar trim and the pillar inner. Then, in the present aspect, the structure includes a device, a speaker, and a harness.

The device is mounted on the vehicle body and housed in the space.

The speaker is inserted into an opening portion opened in the pillar trim from an inside of a vehicle compartment and retained in the opening portion.

The harness is connected to the speaker and is disposed in the space.

In the present aspect, the speaker has a protrusion portion in a part of the speaker to be inserted into an inner side of the pillar trim, the protrusion portion protruding radially outward and having a first width in a direction orthogonal to the protrusion direction; the pillar trim has an insertion acceptance portion in an opening edge portion facing the opening portion on an inner surface side of the pillar trim, the insertion acceptance portion being a gap for accepting insertion of the protrusion portion; and the gap of the insertion acceptance portion has a second width larger than the first width.

DESCRIPTION OF EMBODIMENTS

In the following, an embodiment will be described with reference to the drawings. The embodiment to be described below is one aspect of the present disclosure, and the present disclosure is not limited to the embodiment set forth below except for a substantial configuration.

1. Outline of Front Structure of Vehicle 1

Outline of a front structure of a vehicle 1 according to the present embodiment will be described with reference to FIG. 1.

Figure 1:
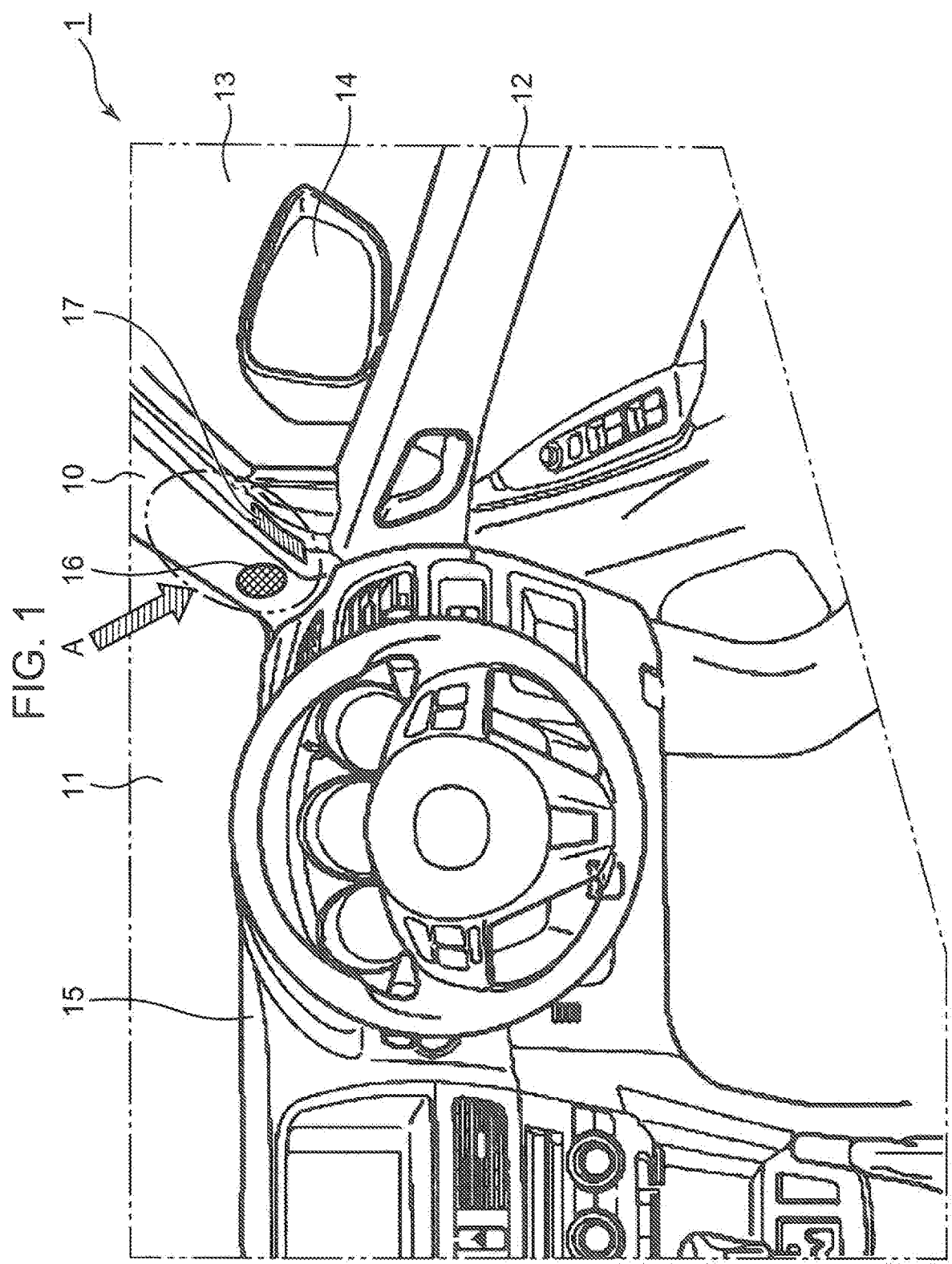
FIG. 1 is a schematic perspective view showing a front structure of a vehicle according to an embodiment.

As shown in FIG. 1, a dashboard 15 equipped with an instrument panel is disposed, in a front portion of a vehicle 1, at the front of a driver's seat in a vehicle compartment, and a front windshield 11 is attached above the dashboard.

On the other hand, a front door 12 having an openable and closable front door windshield 13 is disposed on a side of the driver's seat. A side mirror 14 is attached to a vehicle outside part of the front door 14.

A front pillar 10 extending toward a roof with the dashboard 15 side as a base end is provided at a part as a boundary between the front windshield 11 and the front door windshield 13. The front pillar 10 is provided with a tweeter 16 and an air blowoff port of a defroster duct 17 at a part on a base side (a base end side closer to the dashboard 15) of the front pillar 10 as indicated by an arrow A shown in FIG. 1.

The tweeter 16 is a high frequency sound range speaker and the defroster duct 17 is provided for removing and preventing fogging of the front door windshield 13 so as not to prevent a driver from visually recognizing the side mirror 14.

2. Internal Configuration of Front Pillar 10

An internal configuration of the front pillar 10 will be described with reference to FIG. 2 and FIG. 3.

The front pillar 10 internally houses various devices including the defroster duct 17, a curtain air bag 20, a washer liquid pipe 22, and a guide pole 23.

The defroster duct 17 is provided to extend from the base side of the front pillar 10 to the proximity of an attachment part of a tweeter 16 (a part indicated by an arrow 13) and has the air blowoff port provided in the proximity of the attachment part of the tweeter 16.

The curtain air bag 20 is disposed being folded along an extension direction of the front pillar 10. Then, the curtain air bag 20 is attached to the vehicle body side in the proximity of the attachment part of the tweeter 16 (the part indicated by the arrow B).

Figure 2:
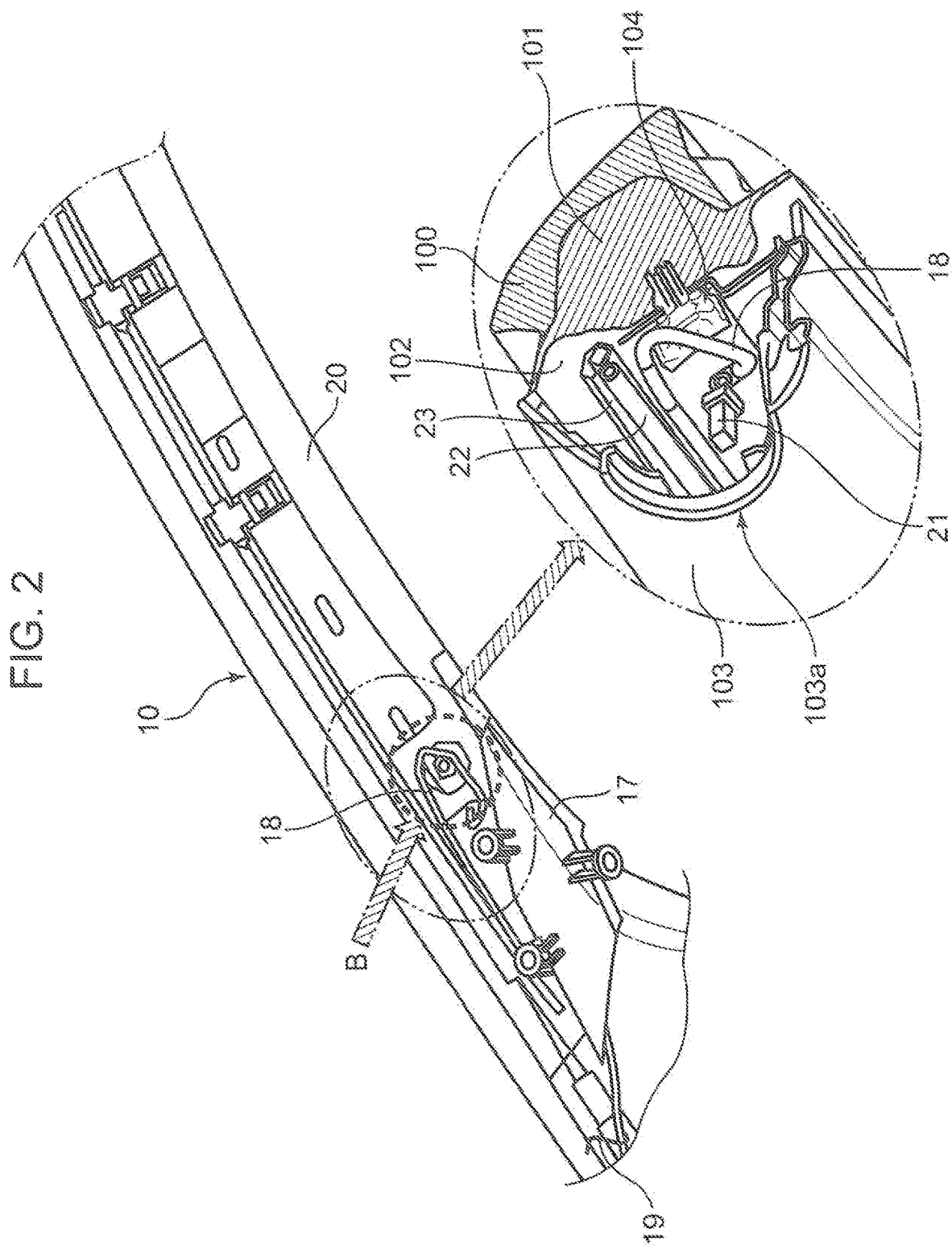
FIG. 2 is a schematic developed view showing an internal configuration of a front pillar.

As shown in a part surrounded by a chain double-dashed line in FIG. 2, the curtain air bag 20 is fixed to a pillar inner 102 by a double clip 104. A pillar outer 101 is inserted between an outer panel 100 and the pillar inner 102. As shown in FIG. 3, the double clip 104 has a head portion 104c and a shaft portion 104a, and insertion of the shaft portion 104a through a part of the curtain air bag 20 and through the pillar inner 102 opens an engagement portion 104b to fix the curtain air bag 20.

The washer liquid pipe 22 and the guide pole 23 are provided at a side opposite to a part in which the curtain air bag 20 is arranged and along the extension direction of the front pillar 10. The guide pole 23 is provided to fix various parts in the front pillar 10.

A harness 18 to be connected to the tweeter 16 is further provided in the front pillar 10. The harness 18 passes from the base side of the front pillar 10 and above the defroster duct 17 to reach the attachment part of the tweeter 16 (the part indicated by the arrow B). The harness 18 is partly fixed at the base side of the front pillar 10 by a clamper 19.

Figure 3:
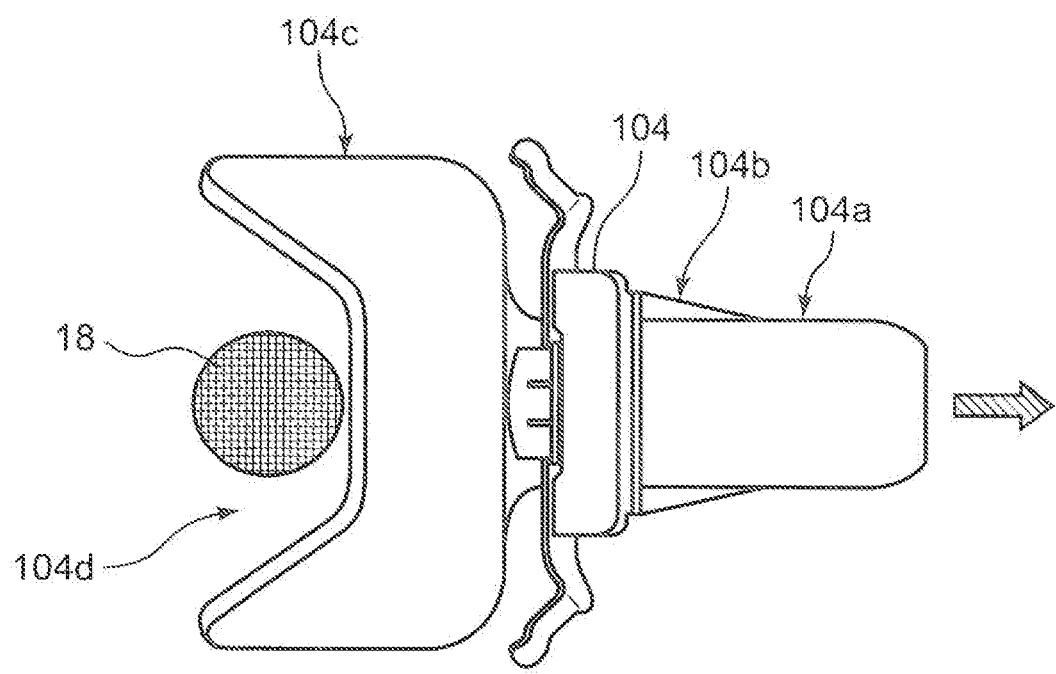
FIG. 3 is schematic side view showing a structure of a double clip for use in attachment of a curtain air bag.

As shown in FIG. 3, the harness 18 is disposed so as to pass, in the proximity of the attachment part of the tweeter 16 (the part indicated by the arrow B), inside a groove portion 104d provided in the head portion 104e of the double clip 104.

As shown in the part surrounded by the chain double-dashed line in FIG. 2, a connector 21 served for the connection with the tweeter 16 is connected to a front end of the harness 18. A pillar trim 103 is attached to the pillar inner 102 with a space defined between the pillar trim 103 and the pillar inner 102. Then, an opening portion 103a is provided in the attachment part of the tweeter 16.

The harness 18 is provided to have a length margin such that the connector 21 can be drawn out to be connected to the tweeter 16 at the time of attachment of the tweeter 16.

3. Configuration of Tweeter 16

A configuration of the tweeter 16 mounted on the front pillar 10 will be described with reference to FIG. 4 to FIG. 7.

Figure 4:
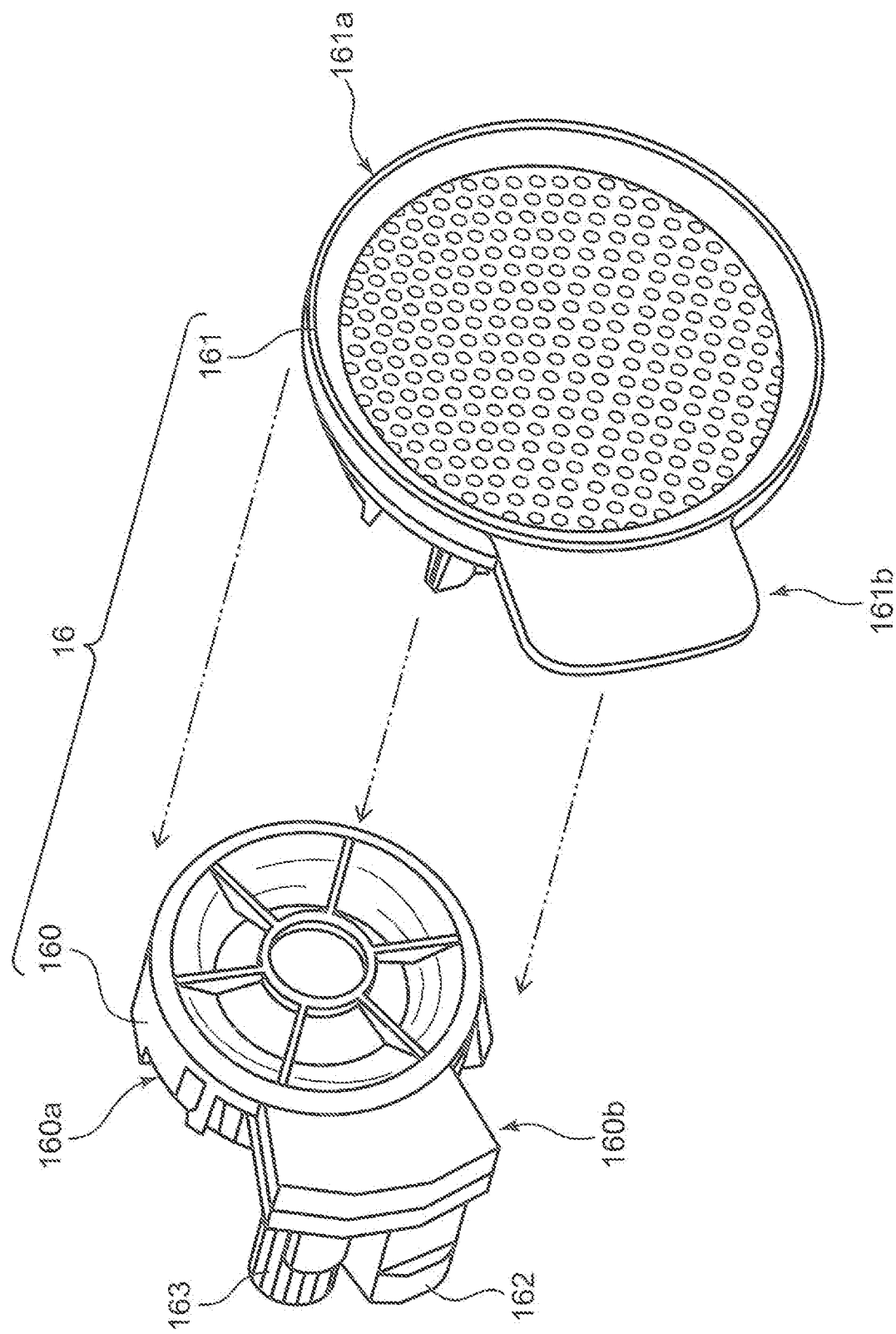
FIG. 4 is a schematic developed view showing a configuration of a tweeter.

As shown in FIG. 4, the tweeter 16 according to the present embodiment is formed with a combination of a tweeter main body 160 and a tweeter cover 161. The tweeter main body 160 is formed with a circular portion 160a having a circular shape in an external appearance when seen from the top, and a protrusion portion 160b which protrudes radially outward from a part of an outer circumference of the circular portion 160a.

The protrusion portion 160b is a plate portion having a generally rectangular shape, with a connector 162 and an electronic part 163 attached to a surface on a side opposite to a side to which the tweeter cover 161 is attached. In the present embodiment, a capacitor as one example of the electronic part 163 is attached to a back surface side of the protrusion portion 160b.

The tweeter cover 161 is also formed with a circular portion 161a having a circular shape in an external appearance when seen from the top, and a protrusion portion 161b which protrudes radially outward from a part of an outer circumference of the circular portion 161a. The tweeter cover 161 is larger in an external appearance when seen from the top than the tweeter main body 160 in a longitudinal direction.

Figure 5:
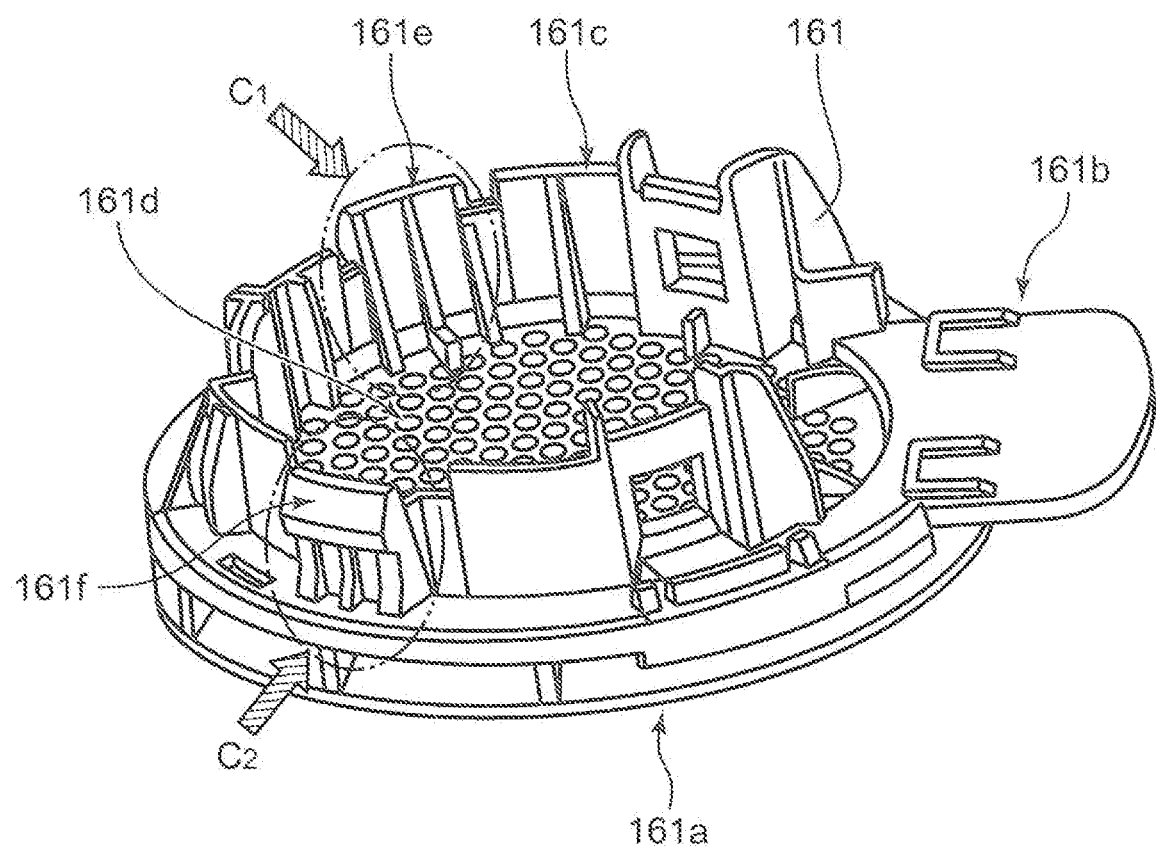
FIG. 5 is a schematic perspective view showing a structure of a tweeter cover.

As shown in FIG. 5, a standing wall portion 161c is provided on a side of a back surface of the tweeter cover 161, i.e., a side to which the tweeter main body 160 is attached, so as to surround an inward portion 161d as a tweeter main body 160 attachment part. Engagement portions 161e and 161f having arrowhead-shaped front end portions are provided at parts surrounding the inward portion 161d on the back surface side of the tweeter cover 161 (parts indicated by arrows $C_1$ and $C_2$).

The front end portions of the engagement portions 161e and 161f are elastically deformable in the radial direction upon receiving force. In the attachment of the tweeter 16 to the pillar trim 103, the tweeter is engaged with an opening edge portion facing the opening portion 103a at three parts including the protrusion portion 161b and the engagement portions 161e and 161f, the opening edge portion being on an inner surface of the pillar trim 103.

Figure 6:
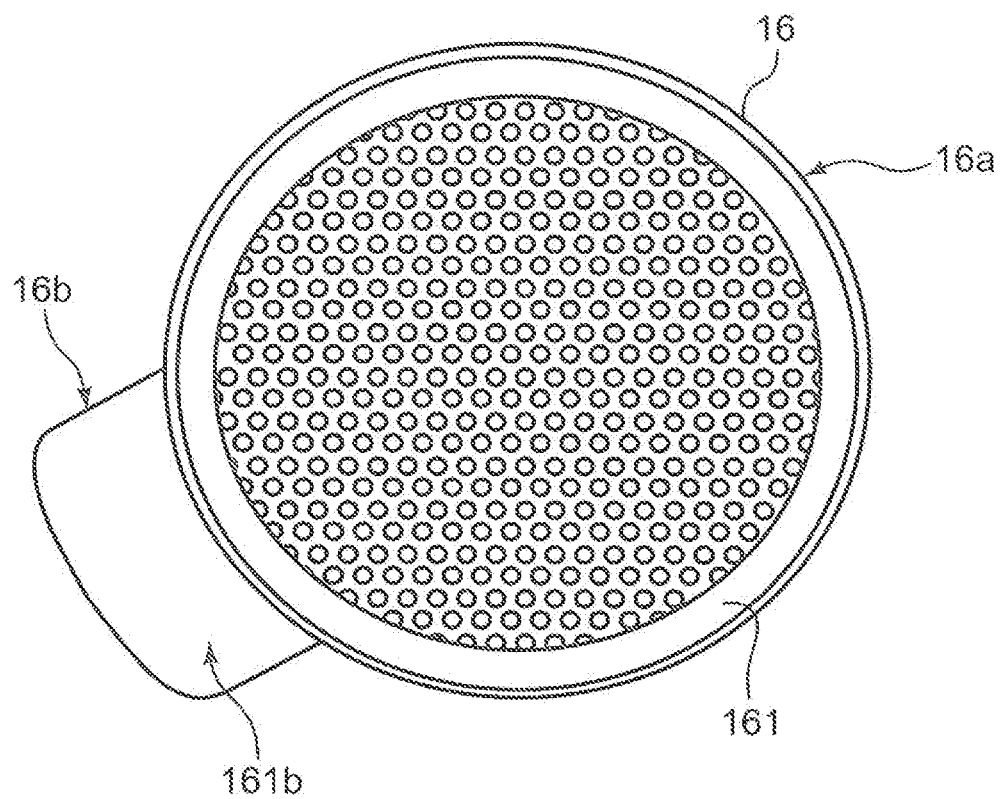
FIG. 6 is a schematic plan view showing a configuration of a top surface of the tweeter.

As shown in FIG. 6, in the tweeter 16 formed with the tweeter main body 160 and the tweeter cover 161 assembled, the tweeter cover 161 appears on the top surface side, with the circular portion 161a of the tweeter cover 161 forming a circular portion 16a of the tweeter 16 and the protrusion portion 161b of the tweeter cover 161 forming a protrusion portion 16b of the tweeter 16.

Figure 7:
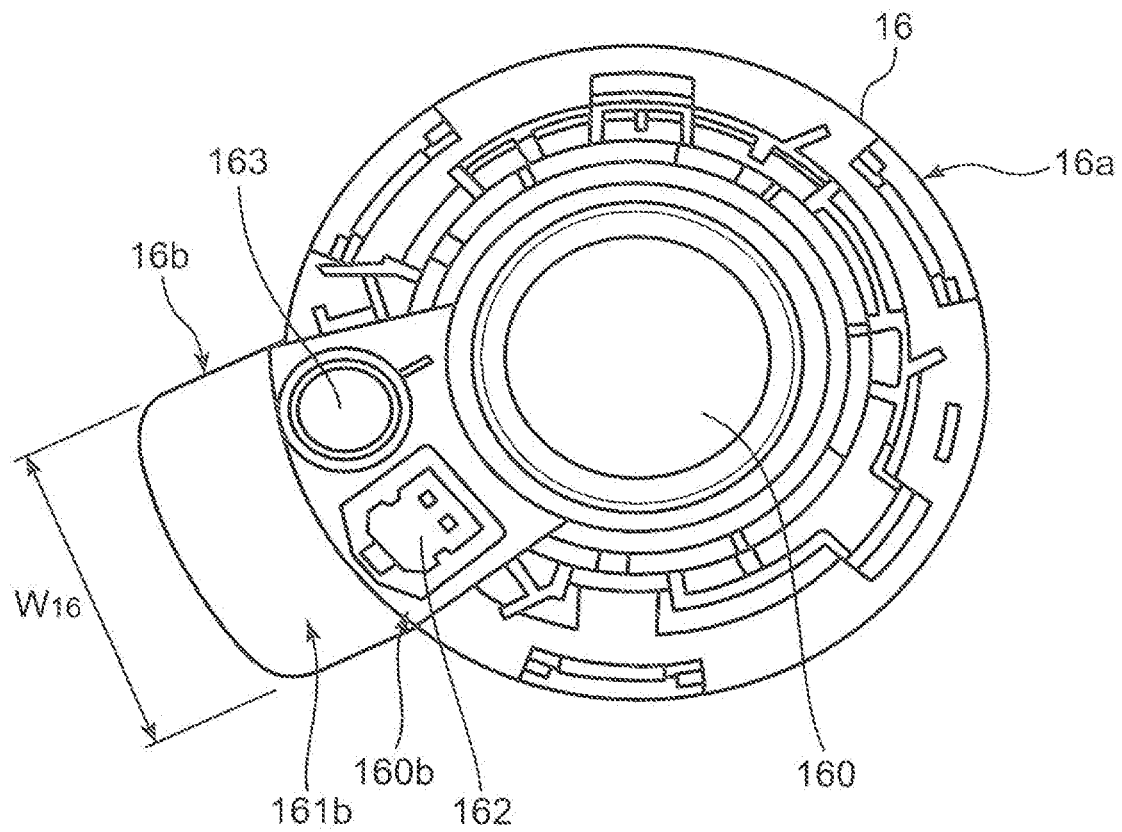
FIG. 7 is a schematic plan view showing a configuration of a back surface of the tweeter.

By contrast, as shown in FIG. 7, an outer edge portion of the tweeter cover 161 and the tweeter main body 160 appear on a back surface side of the tweeter 16. The protrusion portion 160b of the tweeter main body 160 has generally the same width as and a length shorter than those of the protrusion portion 161b of the tweeter cover 161.

A width of the protrusion portion 16b of the tweeter 16 is a width $W_{16}$ which is the width of the protrusion portion 160b of the tweeter main body 160 and the protrusion portion 161b of the tweeter cover 161.

4. Configuration of Pillar Trim 103

Figure 8:
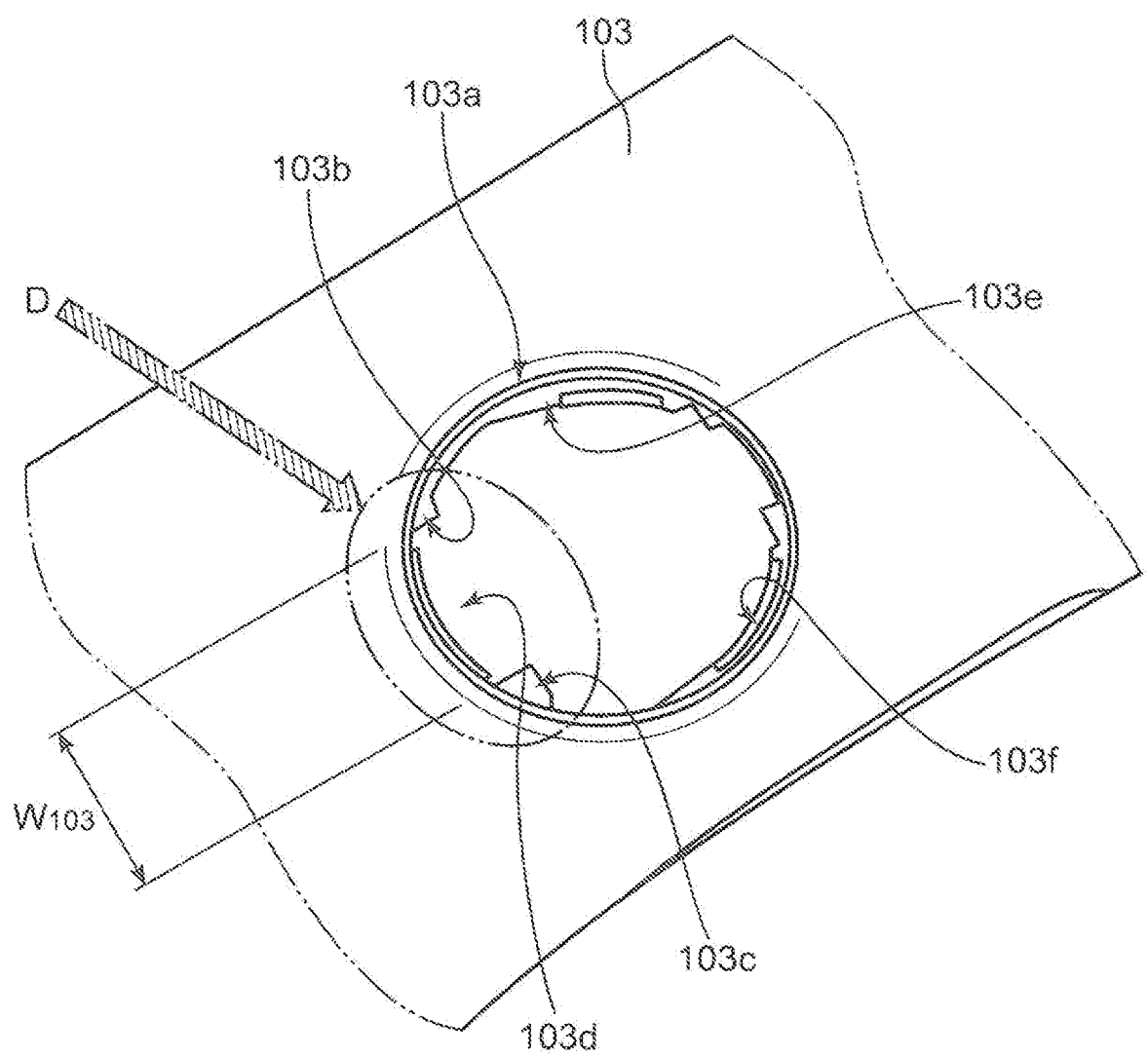
FIG. 8 is a schematic plan view showing a part of a pillar trim.

A configuration of the pillar trim 103, in particular, a configuration around the opening portion 103a will be described with reference to FIG. 8. FIG. 8 is a schematic plan view showing a configuration of the opening portion 103a of the pillar trim 103 and surroundings thereof when seen from inside the vehicle compartment.

As shown in FIG. 8, the pillar trim 103 is provided with the opening portion 103a having a diameter corresponding to the standing wall portion 161c and the engagement portions 161e and 161f of the tweeter cover 161. Two protruding edge portions 103b and 103c protruding toward the inside of the opening are provided, on the inner side of the pillar trim 103, at the opening edge portion facing the opening portion 103a. The two protruding edge portions 103b and 103c are provided to have a gap therebetween (a part indicated by an arrow D). The gap between the protruding edge portion 103b and the protruding edge portion 103c is an insertion acceptance portion 103d which accepts insertion of the protrusion portion 16b of the tweeter 16.

In the pillar trim 103, the insertion acceptance portion 103d is provided, in the opening portion 103a, on the base side of the front pillar 10.

The insertion acceptance portion 103d has a width $W_{103}$ larger than the width $W_{16}$ of the protrusion portion 16b of the tweeter 16. A difference between the width $W_{103}$ and the width $W_{16}$ is empirically determined on the basis of an adjustment margin necessary for adjustment at the work of mounting the tweeter 16 on the front pillar 10 to be described later.

Also as shown in FIG. 8, two engagement edge portions 103e and 103f protruding toward the inside of the opening are provided, on the inner side of the pillar trim 103, at the opening edge portion facing the opening portion 103. The two engagement edge portions 103e and 103f are parts which receive engagement of the engagement portions 161e and 161f provided on the tweeter cover 161 at the time of mounting the tweeter 16 on the front pillar 10.

The engagement edge portions 103e and 103f in the pillar trim 103 are provided to be wider in a circumferential direction of the opening portion 103a than widths of the engagement portions 161e and 161f of the tweeter cover 161 in a circumferential direction. This is for enabling the engagement portions 161e and 161f to be reliably engaged at the time of mounting the tweeter 16 even when a circumferential direction position of the tweeter 16 with respect to the opening portion 103a is adjusted as described above.

5. Mounting of Tweeter 16 on Front Pillar 10

Description will be made of a process of mounting the tweeter 16 on the front pillar 10 as a part of a process of manufacturing the vehicle 1 with reference to FIG. 9 to FIG. 13.

(i) First, the pillar outer 101 and the pillar inner 102 are sequentially attached to an inner side of the outer panel 100 (see FIG. 2).

Figure 9:
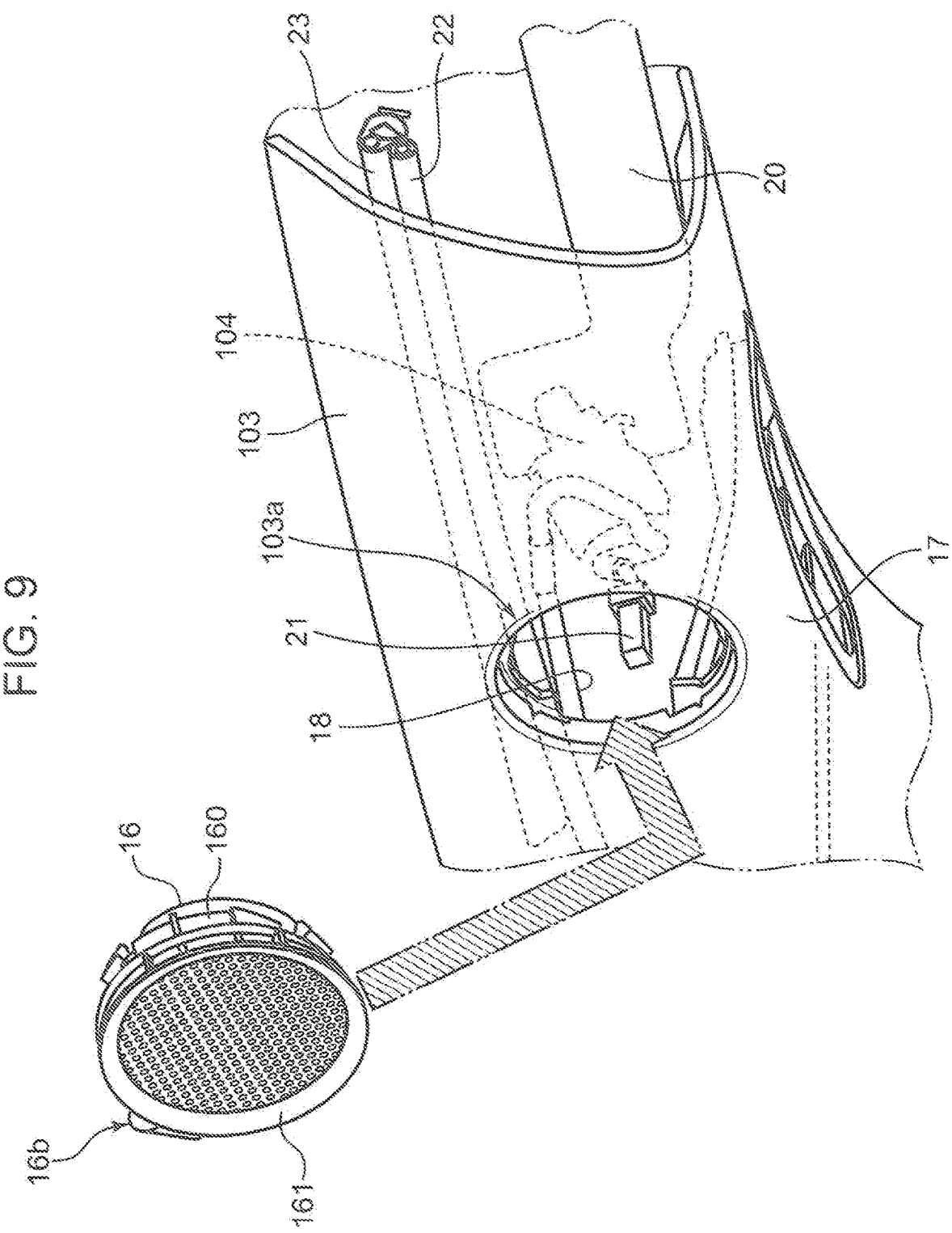
FIG. 9 is a schematic perspective view showing a state before attachment of a tweeter 16 to the pillar trim.

(ii) Next, as shown in FIG. 9, devices such as the defroster duct 17, the curtain air bag 20, the washer liquid pipe 22, and the guide pole 23 are disposed on inner side of the pillar inner 102. As described above, the curtain air bag 20 and the like are attached to the pillar inner 102 using the double clip 104. Specifically, the shaft portion 104a of the double clip 104 is inserted into and through a part of the curtain air bag 20 and the pillar inner 102 to open the engagement portion 104b of the double clip 104, resulting in attachment to the pillar inner 102.

(iii) Next, the harness 18 is disposed along the pillar inner 102 as shown in FIG. 9. In this disposition, the harness 18 is fixed to the base side of the front pillar 10 using the clamper 19 (see FIG. 2).

Also, a part of the harness 18 positioned in the proximity of the opening portion 103a is disposed to pass through the groove portion 104d provided in the head portion 104c of the double clip 104 (see FIG. 2 and FIG. 3).

(iv) Next, the pillar trim 103 is attached as shown in FIG. 9. At this time, the attachment is made such, that the connector 21 connected to the front end portion of the harness 18 appears from the opening portion 103a.

(v) Next, the tweeter 16 is inserted into the opening portion 103a of the pillar trim 103 from the vehicle compartment inner side so as to be attached. The attachment of the tweeter 16 is implemented through the following sub-steps (v-a) to (v-d).

(v-a) As shown in FIG. 9, the connector 21 disposed at a position to appear from the opening portion 103a is slightly drawn out from the opening portion 103a. Then, the connector 21 is connected to the connector 162 provided on a back surface side of the protrusion portion 16b of the tweeter 16 (see FIG. 7).

Figure 10:
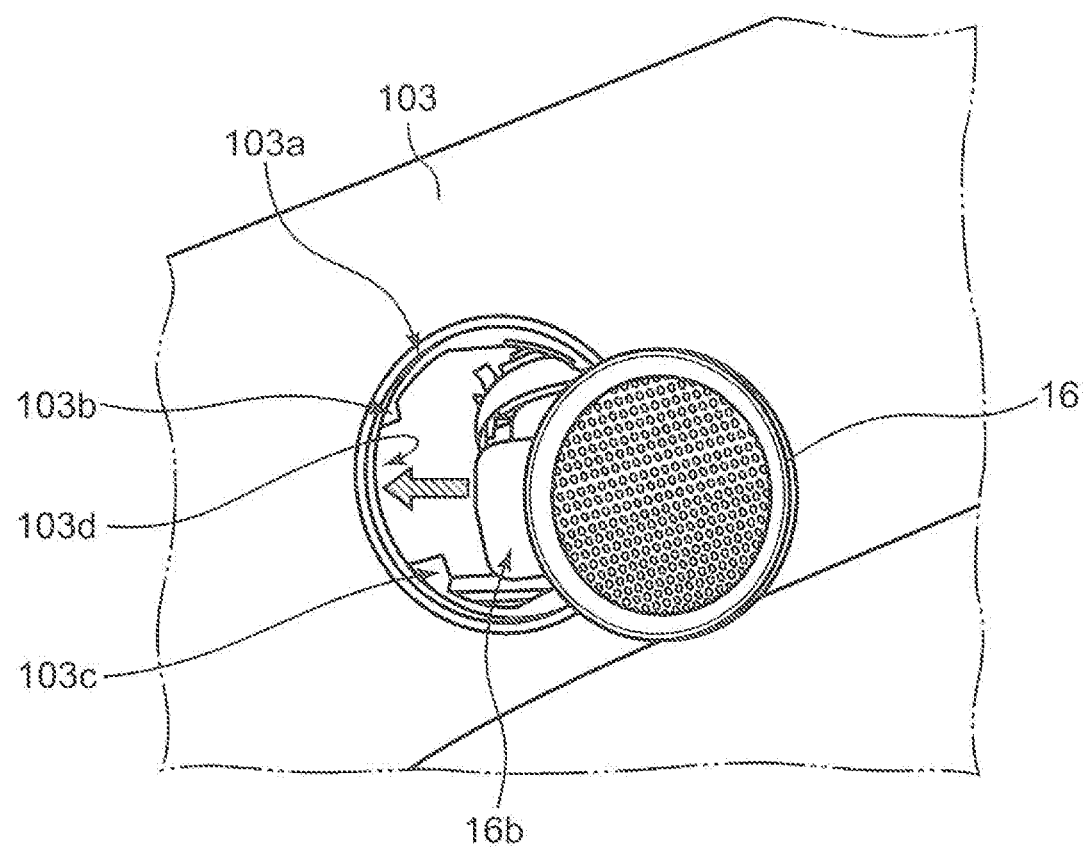
FIG. 10 is a schematic step view showing a step of attaching the tweeter to the pillar trim.
Figure 11:
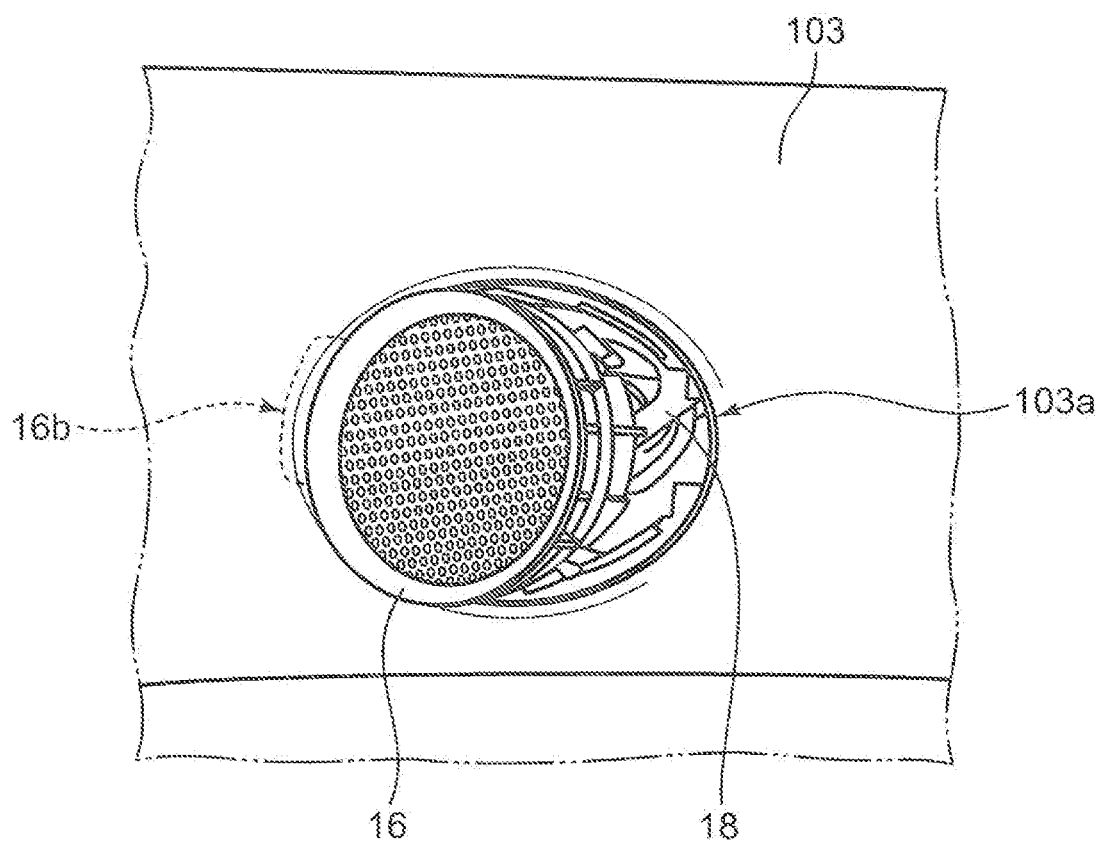
FIG. 11 is a schematic step view showing a step of attaching the tweeter to the pillar trim.

(v-b) Next, as shown in FIG. 10, the protrusion portion 16b of the tweeter 16 is inserted into the insertion acceptance portion 103d of the pillar trim 103. On this occasion, the protrusion portion 16b of the tweeter 16 is inserted at an angle to be oblique to an opening surface of the opening portion 103a. This makes a base portion of the protrusion portion 16b in the tweeter 16 be snagged in an opening edge portion of the insertion acceptance portion 103d of the pillar trim 103. Then, as shown in FIG. 11, a part of the tweeter 16 on a side opposite to the protrusion portion 16b is brought into a state of floating from the opening edge portion of the pillar trim 103.

Figure 12:
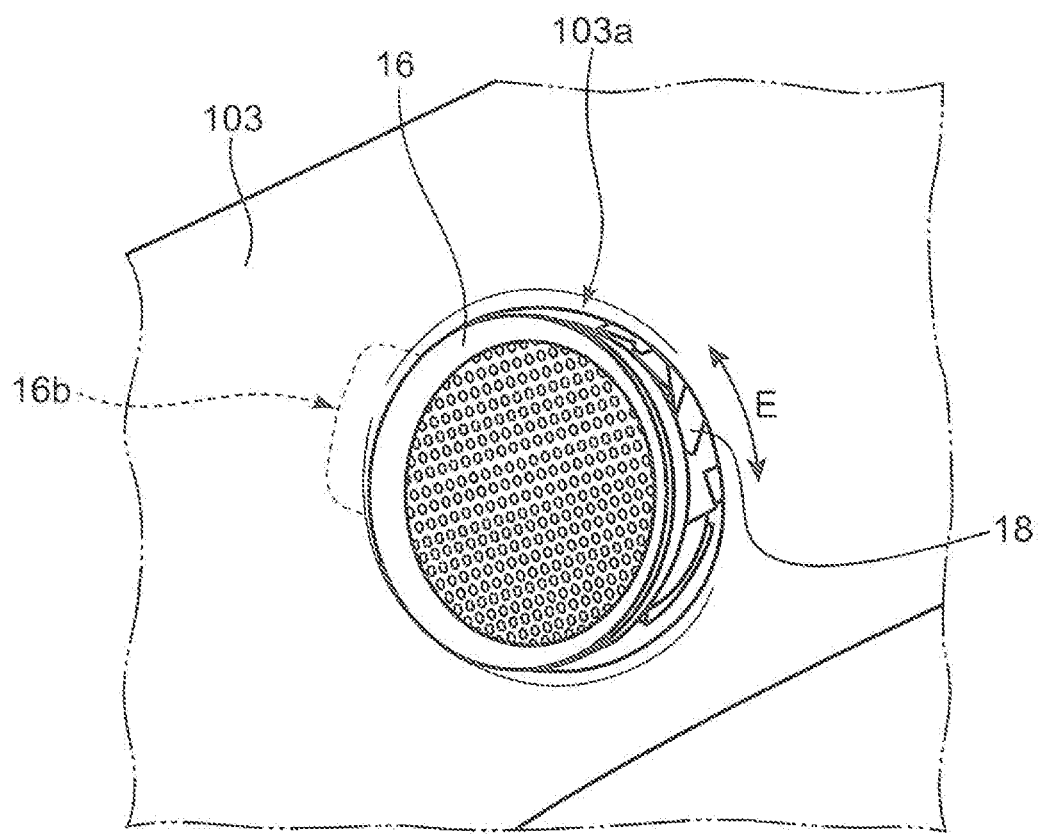
FIG. 12 is a schematic step view showing a step of attaching the tweeter to the pillar trim.

(v-c) Next, as shown in FIG. 12, a position of the tweeter 16 in the circumferential direction is adjusted (an arrow E) such that such interference of the harness 18 will not occur as snagging and catch of the harness by other devices (devices such as the defroster duct 17, the curtain air bag 20, the washer liquid pipe 22, and the guide pole 23) in the pillar trim 103 while a state inside the pillar trim 103 is visually checked through a gap portion between the part of the tweeter 16 on the side opposite to the protrusion portion 16b and the opening edge portion of the pillar trim 103.

Additionally, the adjustment of the position of the tweeter 16 in the circumferential direction is implemented to maintain a state where the harness 18 is inserted through the groove portion 104d in the head portion 104c of the double clip 104.

The adjustment of the position of the tweeter 16 in the circumferential direction can be made by a difference between the width $W_{16}$ and the width $W_{103}$.

Figure 13:
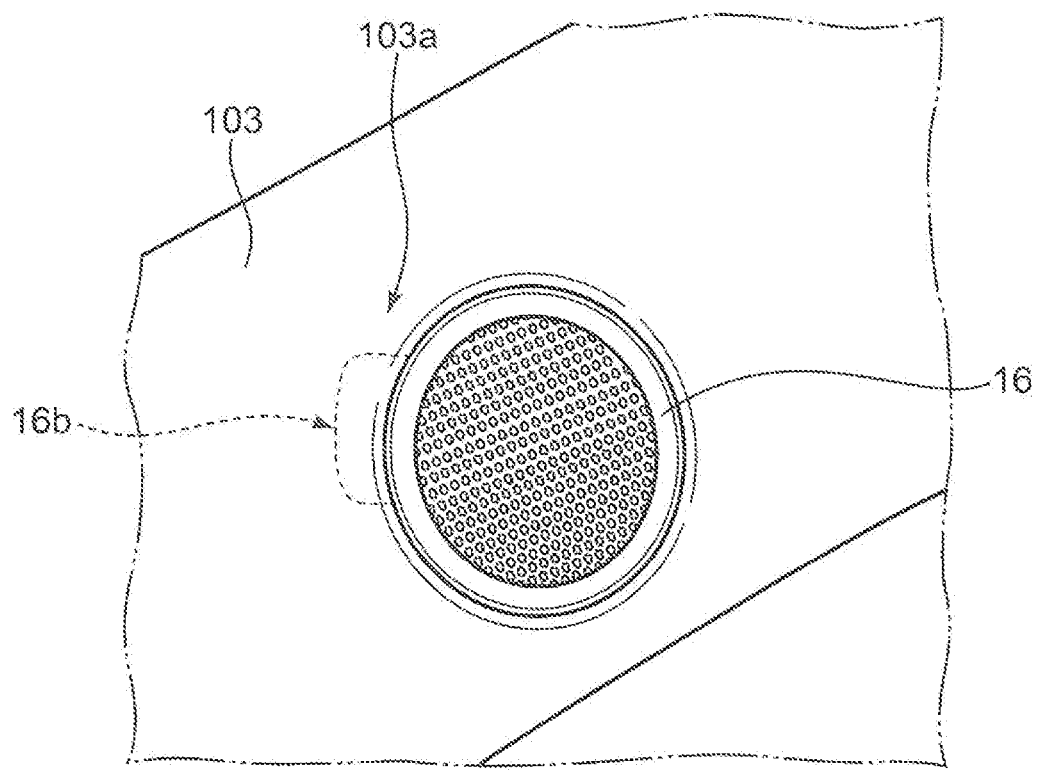
FIG. 13 is a schematic step view showing a step of attaching the tweeter to the pillar trim.

(v-d) Lastly, as shown in FIG. 13, the part of the tweeter 16 on the side opposite to the protrusion portion 16b is pushed into the pillar trim 103. This causes the engagement portions 161e and 161f in the tweeter cover 161 of the tweeter 16 to engage with the engagement edge portions 103e and 103f of the pillar trim 103, thereby completing mounting of the tweeter 16 on the front pillar 10.

6. Effects

First, the structure for mounting the tweeter 16 on the front pillar 10 in the vehicle 1 according to the present embodiment can realize excellent sound quality because the tweeter 16 is mounted on the front pillar 10. Specifically, mounting the tweeter 16 on the front pillar 10 enables arrangement of the tweeter 16 near a passenger's ear to deliver sound directly to the ear. This makes hardly happen such a problem of diffusion of sound due to reflection by the front windshield 11 and a problem of indirect sound, the problems occurring in a case where speakers such as tweeters are arranged on both widthwise sides of an upper surface of the dashboard 15. Accordingly, the present embodiment is excellent when making much of sound quality.

Also in the present embodiment, the tweeter 16 can be mounted while a state of the harness 18 in the pillar trim 103 is visually checked after having the base side of the protrusion portion 16b of the tweeter 16 caught by the opening edge portion of the insertion acceptance portion 103d of the pillar trim 103. Specifically, at the time of mounting the tweeter 16, while it is visually checked that the devices (devices such as the defroster duct 17, the curtain air bag 20, the washer liquid pipe 22, and the guide pole 23) mounted on the vehicle body and the harness 18 have no interference (snagging or catching) with each other, the tweeter 16 can be mounted.

Accordingly, in the structure for mounting the tweeter 16 on the front pillar 10 in the vehicle 1 according to the present embodiment, it is possible to suppress the harness 18 connected to the tweeter 16 from interfering with the devices (devices such as the defroster duct 17, the curtain air bag 20, the washer liquid pipe 22, and the guide pole 23) mounted on the vehicle body while the tweeter 16 is disposed in the front pillar 10.

Also in the present embodiment, the connector 162 is provided on the back surface side of the protrusion portion 16b in the tweeter 16 (the back surface side of the protrusion portion 160b of the tweeter main body 160) and is connected to the connector 21 in the front end portion of the harness 18. Therefore, a connection portion of the harness 18 with the tweeter 16 can be arranged within the pillar trim 103, so that the harness 18 will not be exposed to the outside of the front pillar 10. As a result, it is possible to obtain excellent designability and prevent the harness 18 from being detached from the tweeter 16 due to external force or the like.

Additionally, provision of the connector 162 on the protrusion portion 16b of the tweeter 16 facilitates fine adjustment of a position of the harness 18 in the pillar trim 103 at the time of attaching the tweeter 16 to the pillar trim 103 in the above (v-c) sub-step. Specifically, since at the time of attachment of the tweeter 16 to the pillar trim 103, the adjustment of the position of the tweeter 16 in the circumferential direction can be made by first having the protrusion portion 16b of the tweeter 16 caught by the insertion acceptance portion 103d of the pillar trim 103 in the above (v-c) sub-step, movement of the harness 18 can be suppressed more than in a ease where the harness 18 is connected on the side opposite to the protrusion portion 16b. Accordingly, position adjustment of the harness 18 at the time of attachment of the tweeter 16 is easy in the present embodiment.

Additionally, in the structure for mounting the tweeter 16 on the front pillar 10 in the vehicle 1 according to the present embodiment, since the insertion acceptance portion 103d in the pillar trim 103 is provided on the base side of the front pillar 10 (the base end side on the dashboard), high workability can be ensured at the time of mounting the tweeter 16. Specifically, providing the insertion acceptance portion 103d of the pillar trim 103 on the base side of the front pillar 10 enables a worker to easily visually check the harness 18 in the pillar trim 103 through the opening portion 103a from obliquely above at the time of attachment of the tweeter 16 to the pillar trim 103. Accordingly, it is possible to easily visually check that the harness 18 will not interfere with the devices (devices such as the defroster duct 17, the curtain air bag 20, the washer liquid pipe 22, and the guide pole 23) mounted on the vehicle body, and therefore have excellent workability at the time of mounting the tweeter 16.

Additionally, in the structure for mounting the tweeter 16 on the front pillar 10 in the vehicle 1 according to the present embodiment, since the harness 18 is disposed in the groove portion 104d provided in the head portion 104c of the double clip 104, such interference can be easily suppressed as catch of the harness 18 by the devices (devices such as the defroster duct 17, the curtain air bag 20, the washer liquid pipe 22, and the guide pole 23) mounted on the vehicle body at the time of mounting the tweeter 16. Specifically, since the harness 18 in the pillar trim 103 is supported by the part of the head portion 104c of the double clip 104, a region requiring adjustment in the harness 18 at the time of mounting the tweeter 16 is limited to an area from a part supported by the head portion 104c of the double clip 104 to a part associated with the connection with the tweeter 16 (the part connected to the connector 162). It is therefore effective for improving workability.

Modifications

While the above embodiment has been described with respect to the structure for mounting the tweeter 16 on the front pillar 10 on the driver's seat side, the present disclosure is not limited thereto. The above structure can be adopted, for example, to a structure for mounting a tweeter on a front pillar on a passenger's seat side.

Also, while in the above embodiment, the defroster duct 17, the curtain air bag 20, the washer liquid pipe 22, and the guide pole 23 are used as one example of a device housed in a space between the pillar trim 103 and the pillar inner 102 and mounted on the vehicle body, the present disclosure is not limited to such an example. For example, various electric wires and signal wires can be included as such devices.

Also, while in the above embodiment, the tweeter 16 is adopted as one example of a speaker, the present disclosure is not limited to such an example. A middle frequency or low frequency sound range speaker may be mounted on the front pillar.

Also, while in the above embodiment, the tweeter 16 having the circular portion 16a of a circular shape when viewed from the top is adopted, the present disclosure is not limited to such an example. A speaker having a protrusion portion formed as a protrusion from, for example, a part of an oval or a polygon when viewed from the top can be adopted.

Also, while in the above embodiment, one tweeter 16 is mounted on one front pillar 10, the present disclosure is not limited to such an example. It is also possible to mount, for example, two or more speakers on one front pillar. In this case, speakers having different sound ranges can be arranged in parallel to each other and alternatively, speakers having the same sound range can be arranged in parallel.

Additionally, while in the above embodiment, the protrusion portion 16b in the tweeter 16 is set to be a plate having a rectangular shape when viewed from the top, the present disclosure is not limited to such an example. The protrusion portion may be formed in, for example, a semi-circular shape or a semi-oval shape or in a polygon when viewed from the top. It is also possible to provide, for example, a plurality of comb-teeth protrusion portions. It is further possible to provide a three-dimensional protrusion portion to improve rigidity in order to make hard the delivery of vibration of the speaker to the pillar trim.

Although the above embodiment does not in particular refer to an exterior color of the harness 18 and the like, a conspicuous color such as yellow may be adopted in consideration of visibility during working. Alternatively, a shrinkage tube of a conspicuous color such as yellow may be adhered to only a part of the harness 18 near the opening portion 103*a*.

While the above embodiment adopts a configuration in which the surface of the tweeter 16 is disposed on the same surface as that surrounding the opening portion 103*a* in the pillar trim 103, the present disclosure is not limited to such an example. It is possible to direct the speaker, for example, to the driver's seat side or the passenger's seat side. Thus directing the speaker to the driver side can be realized by, for example, forming a speaker cover corresponding to the tweeter cover 161 to have a curved cylindrical shape. This enables sound to arrive more directly to a passenger in the vehicle compartment.

Summary of Present Disclosure

In a structure for mounting a speaker on a front pillar in a vehicle according to one aspect of the present disclosure, the front pillar has a pillar inner attached to a vehicle body, and a pillar trim attached to the pillar inner with a space defined between the pillar trim and the pillar inner. Then, in the present aspect, the structure includes a device, a speaker, and a harness.

The device is mounted on the vehicle body and housed in the space.

The speaker is inserted into an opening portion opened in the pillar trim from an inside of a vehicle compartment and retained in the opening portion.

The harness is connected to the speaker and is disposed in the space.

In the present aspect, the speaker has a protrusion portion in a part of the speaker to be inserted into an inner side of the pillar trim, the protrusion portion protruding radially outward and having a first width in a direction orthogonal to the protrusion direction, the pillar trim has an insertion acceptance portion in an opening edge portion facing the opening portion on an inner surface side of the pillar trim, the insertion acceptance portion being a gap for accepting insertion of the protrusion portion, and the gap of the insertion acceptance portion has a second width larger than the first width.

In the structure for mounting a speaker according to the above aspect, the speaker is inserted into the opening portion of the pillar trim from the inside of the vehicle compartment and retained in the opening portion. The speaker also has the protrusion portion, the protrusion portion being inserted into the insertion acceptance portion of the pillar trim.

The structure for mounting a speaker on a front pillar in a vehicle according to the above aspect can realize excellent sound quality because the speaker is mounted on the front pillar. Specifically, mounting the speaker on the front pillar enables arrangement of the speaker near a passenger's ear to deliver sound directly to the ear. This makes hardly happen such a problem of diffusion of sound due to reflection by the front windshield and a problem of indirect sound, the problems occurring in a case where speakers are arranged on both widthwise sides of an upper surface of a dashboard. Accordingly, the present aspect is excellent when making much of sound quality.

Also in the above aspect, the speaker can be mounted while a state of the harness in the opening portion is checked after having the base side of the protrusion portion of the speaker caught by the opening edge portion of the insertion acceptance portion of the pillar trim. Specifically, at the time of mounting the speaker, while it is checked that the devices mounted on the vehicle body and the harness have no interference with each other, the speaker can be mounted.

Accordingly, in the structure for mounting a speaker according to the present aspect, it is possible to suppress the harness connected to the speaker from interfering with the devices mounted on the vehicle body while the speaker is disposed in the front pillar.

In the structure for mounting a speaker on a front pillar in a vehicle according to another aspect of the present disclosure, the speaker has a connection portion to which the harness is connected, the connection portion being provided in a part of the speaker facing a space side.

Since in the above aspect, in the speaker, the connection portion with the harness is set to be a part facing the space side, the harness will not be exposed to the outside of the front pillar. As a result, it is possible to obtain excellent designability and prevent the harness from being detached from the speaker due to external force or the like.

In the structure for mounting a speaker on a front pillar in a vehicle according to still another aspect of the present disclosure, the protrusion portion in the speaker has, in a surface portion of facing the space side, the connection portion to which the harness is connected.

Since in the above embodiment, the connection portion with the harness in the speaker is set to be a surface portion of the protrusion portion facing the above space side, fine adjustment of a position of the harness in the pillar trim can be facilitated at the time of attaching the speaker to the pillar trim. Specifically, since at the time of attachment of the speaker to the pillar trim, as described above, after first having the protrusion portion caught by the insertion acceptance portion, the position of the speaker is adjusted in the circumferential direction with the caught part as a supporting point, movement of the harness can be suppressed more than in a case where the harness is connected on the side opposite to the protrusion portion. Accordingly, position adjustment of the harness at the time of attachment of the speaker is easy in the present aspect.

In the structure for mounting a speaker on a front pillar in a vehicle according to yet another aspect of the present disclosure, the insertion acceptance portion is provided on a base side of the front pillar in a circumferential edge of the opening portion.

Since in the above aspect, the insertion acceptance portion in the pillar trim is provided on the base side of the front pillar, high workability can be ensured at the time of mounting the speaker. Specifically, providing the insertion acceptance portion of the pillar trim on the base side of the front pillar enables a worker to check the harness in the opening portion from obliquely above at the time of attachment of the speaker to the pillar trim. Accordingly, it is possible to easily visually check that the harness will not interfere with the device mounted on the vehicle body, and therefore have excellent workability at the time of mounting the speaker.

In the structure for mounting a speaker on a front pillar in a vehicle according to yet another aspect of the present disclosure, the other device is mounted on the vehicle body by using a clip having a head portion and a shaft portion and inserting the clip such that the shaft portion of the clip passes through the pillar inner, the head portion has a groove portion in a part of the head portion facing the space, and the harness is disposed in the groove portion.

In the above aspect, since the harness is disposed in the groove portion provided in the head portion of the clip, such interference can be easily suppressed as catch of the harness by the device mounted on the vehicle body at the time of mounting the speaker. Specifically, since the harness in the pillar trim is supported by the head portion of the clip, a region requiring adjustment in the harness at the time of mounting the speaker is limited to an area from a part supported by the head portion of the clip to a part associated with connection with the speaker. It is therefore effective for improving workability.

A method of manufacturing a vehicle according to one aspect of the present disclosure includes:
(i) a step of attaching a pillar inner, to a vehicle body, at a front pillar part in the vehicle;
(ii) a step of attaching a device to the pillar inner;
(iii) a step of disposing a harness along the pillar inner;
(iv) a step of attaching a pillar trim having an opening portion to the pillar inner with a space defined between the pillar trim and the pillar inner; and
(v) a step of attaching a speaker to the opening portion by insertion into the opening portion from an inside of a vehicle compartment.

Then, the method of manufacturing a vehicle according to the present aspect, in a part of the speaker to be inserted into an inner side of the pillar trim, a protrusion portion is provided that protrudes radially outward and has a first width in a direction orthogonal to the protrusion direction, and an insertion acceptance portion is provided in an opening edge portion facing the opening portion on an inner surface side of the pillar trim, the insertion acceptance portion being a gap for accepting insertion of the protrusion portion and having a second width larger than the first width.

The step of mounting a speaker according to the present aspect includes:
(v-a) a sub-step of connecting the harness drawn out through the opening portion to a connection portion provided on a part of the speaker facing a space side;
(v-b) a sub-step of temporary entrust of making a base portion of the protrusion portion in the speaker be snagged in an opening edge portion of the insertion acceptance portion and bringing a part of the speaker on a side opposite to a side where the protrusion portion is provided in the speaker into a state of floating from the opening edge portion of the pillar trim;
(v-c) a sub-step of adjusting the position of the speaker in a circumferential direction with respect to the opening portion of the pillar trim while checking a position of the harness with respect to the device through a gap portion between the opposite side part in the speaker and the opening edge portion of the pillar trim; and
(v-d) a sub-step of attaching the speaker by inserting a part of the speaker other than the protrusion portion into the opening portion of the pillar trim to retain in the opening portion after adjusting of the position of the speaker in the circumferential direction.

In the method of manufacturing a vehicle according to the present aspect, similarly to the above, high sound quality can be realized by disposing the speaker in the front pillar, while such interference can be suppressed as catch of the harness connected to the speaker by the device mounted on the vehicle body.

In the method of manufacturing a vehicle according to another aspect of the present disclosure, in the step of attaching the device, attachment of the device to the pillar inner is implemented by using a clip that has a head portion with a groove portion formed on a part to be the space side and has a shaft portion, and inserting the clip such that the shaft portion of the clip passes through the pillar inner, in the step of disposing the harness, the harness is disposed so as to pass in the groove portion, and in the step of adjusting the position in the circumferential direction, a state where the harness passes through the groove portion is maintained.

In the method of manufacturing a vehicle according to the above aspect, since a position of the speaker in the circumferential direction can be adjusted while the harness is maintained in a state of passing through the groove portion provided in the head portion of the clip, a region requiring confirmation that such interference will not occur as catch of the harness by the device mounted on the vehicle body is limited to an area from a part supported by the head portion of the clip to a part associated with connection with the speaker. Accordingly, in the above aspect, troublesome work can be avoided to ensure high workability.

In the method of manufacturing a vehicle according to still another aspect of the present disclosure, the connection portion in the speaker is provided in a surface portion of the protrusion portion facing the space side.

In the method of manufacturing a vehicle according to the above aspect, similarly to the above, movement of the harness can be easily suppressed more than in a case where the harness is connected on the side opposite to the protrusion portion. Accordingly, position adjustment of the harness is easy in the above sub-step (v-c) of adjusting the position of the speaker in the circumferential direction in the present aspect.

As described in the foregoing, in each of the above aspects, disposing the speaker in the front pillar realizes high sound quality, while suppressing interference of the harness connected to the speaker with other devices housed in the pillar trim.

The invention claimed is:

1. A structure for mounting a speaker on a front pillar in a vehicle, the structure comprising:
    a front pillar having a pillar inner attached to a vehicle body, and a pillar trim attached to the pillar inner with a space defined between the pillar trim and the pillar inner;
    a device mounted on the vehicle body and housed in the space;
    a speaker inserted into an opening portion opened in the pillar trim from an inside of a vehicle compartment and retained in the opening portion; and
    a harness connected to the speaker and disposed in the space, wherein
    the speaker has a protrusion portion in a part of the speaker to be inserted into an inner side of the pillar trim, the protrusion portion protruding radially outward and having a first width in a direction orthogonal to the protrusion direction,
    the pillar trim has an insertion acceptance portion in an opening edge portion facing the opening portion on an inner surface side of the pillar trim, the insertion acceptance portion being a gap for accepting insertion of the protrusion portion, and
    the gap of the insertion acceptance portion has a second width larger than the first width.

2. The structure for mounting a speaker on a front pillar in a vehicle according to claim 1, wherein the speaker has a connection portion to which the harness is connected, the connection portion being provided in a part of the speaker facing a space side.

3. The structure for mounting a speaker on a front pillar in a vehicle according to claim 2 wherein the connection portion to which the harness is connected is provided in a surface portion of the protrusion portion in the speaker facing the space side.

4. The structure for mounting a speaker on a front pillar in a vehicle according to claim 1, wherein the insertion acceptance portion is provided on a base side of the front pillar in a circumferential edge of the opening portion.

5. The structure for mounting a speaker on a front pillar in a vehicle according to claim 1, wherein
the device is mounted on the vehicle body by using a clip having a head portion and a shaft portion and inserting the clip such that the shaft portion of the clip passes through the pillar inner,
the head portion has a groove portion in a part of the head portion facing the space, and
the harness is disposed in the groove portion.

6. A method of manufacturing a vehicle, the method comprising:
a step of attaching a pillar inner, to a vehicle body, at a front pillar part in the vehicle;
a step of attaching a device to the pillar inner;
a step of disposing a harness along the pillar inner;
a step of attaching a pillar trim having an opening portion to the pillar inner with a space defined between the pillar trim and the pillar inner; and
a step of attaching a speaker to the opening portion by insertion into the opening portion from an inside of a vehicle compartment, wherein
in a part of the speaker to be inserted into an inner side of the pillar trim, a protrusion portion is provided that protrudes radially outward and having a first width in a direction orthogonal to the protrusion direction,
an insertion acceptance portion is provided in an opening edge portion facing the opening portion on an inner surface side of the pillar trim, the insertion acceptance portion being a gap for accepting insertion of the protrusion portion and having a second width larger than the first width, and
the step of attaching a speaker includes:
a sub-step of connecting the harness drawn out through the opening portion to a connection portion provided on a part of the speaker facing a space side;
a sub-step of temporary entrust of making a base portion of the protrusion portion in the speaker be snagged in an opening edge portion of the insertion acceptance portion and bringing a part of the speaker on a side opposite to a side where the protrusion portion is provided in the speaker into a state of floating from the opening edge portion of the pillar trim;
a sub-step of adjusting a position of the speaker in a circumferential direction with respect to the opening portion of the pillar trim while checking a position of the harness with respect to the device through a gap portion between the opposite side part in the speaker and the opening edge portion of the pillar trim; and
a sub-step of attaching the speaker by inserting a part of the speaker other than the protrusion portion into the opening portion of the pillar trim to retain in the opening portion after adjusting of the position of the speaker in the circumferential direction.

7. The method of manufacturing a vehicle according to claim 6, wherein
in the step of attaching the device, attachment of the device to the pillar inner is implemented by using a clip that has a head portion with a groove portion formed on a part to be the space side and has a shaft portion, and inserting the clip such that the shaft portion of the clip passes through the pillar inner,
in the step of disposing the harness, the harness is disposed so as to pass in the groove portion, and
in the step of adjusting the position in the circumferential direction, a state where the harness passes through the groove portion is maintained.

8. The method of manufacturing a vehicle according to claim 6, wherein
the connection portion in the speaker is provided in a surface portion of the protrusion portion facing the space side.

9. The structure for mounting a speaker on a front pillar in a vehicle according to claim 2, wherein the insertion acceptance portion is provided on a base side of the front pillar in a circumferential edge of the opening portion.

10. The structure for mounting a speaker on a front pillar in a vehicle according to claim 3, wherein the insertion acceptance portion is provided on a base side of the front pillar in a circumferential edge of the opening portion.

11. The structure for mounting a speaker on a front pillar in a vehicle according to claim 2, wherein
the device is mounted on the vehicle body by using a clip having a head portion and a shaft portion and inserting the clip such that the shaft portion of the clip passes through the pillar inner,
the head portion has a groove portion in a part of the head portion facing the space, and
the harness is disposed in the groove portion.

12. The structure for mounting a speaker on a front pillar in a vehicle according to claim 3, wherein
the device is mounted on the vehicle body by using a clip having a head portion and a shaft portion and inserting the clip such that the shaft portion of the clip passes through the pillar inner,
the head portion has a groove portion in a part of the head portion facing the space, and
the harness is disposed in the groove portion.

13. The structure for mounting a speaker on a front pillar in a vehicle according to claim 4, wherein
the device is mounted on the vehicle body by using a clip having a head portion and a shaft portion and inserting the clip such that the shaft portion of the clip passes through the pillar inner,
the head portion has a groove portion in a part of the head portion facing the space, and
the harness is disposed in the groove portion.

14. The method of manufacturing a vehicle according to claim 7, wherein
the connection portion in the speaker is provided in a surface portion of the protrusion portion facing the space side.

* * * * *